United States Patent [19]

Sawada

[11] 4,442,702

[45] Apr. 17, 1984

[54] METHOD OF AND APPARATUS FOR INSEPCTING LIQUID STORAGE TANKS FOR LEAKS BY MEANS OF PRESSURE DECREASE AND INCREASE

[75] Inventor: Koji Sawada, Tokyo, Japan

[73] Assignee: Nippon Engineer Service Kabushiki Kaisha, Tokyo, Japan

[21] Appl. No.: 375,264

[22] PCT Filed: Sep. 9, 1981

[86] PCT No.: PCT/JP81/00227

§ 371 Date: Apr. 26, 1982

§ 102(e) Date: Apr. 26, 1982

[87] PCT Pub. No.: WO82/00885

PCT Pub. Date: Mar. 18, 1982

[30] Foreign Application Priority Data

Sep. 9, 1980 [JP] Japan .............................. 55-123968

[51] Int. Cl.³ ............................................ G01M 3/32
[52] U.S. Cl. ...................................................... 73/49.2
[58] Field of Search .............................. 73/49.2, 40

[56] References Cited

U.S. PATENT DOCUMENTS

| | | | |
|---|---|---|---|
| 2,239,612 | 4/1941 | Lawlor | 137/593 X |
| 2,270,447 | 1/1942 | Jones et al. | 73/40 |
| 2,912,852 | 11/1959 | Trinneer | 73/49.2 |
| 3,350,704 | 10/1967 | Kessler | 73/40 |
| 3,921,436 | 11/1975 | Plegat | 73/49.2 X |
| 4,186,591 | 2/1980 | Mooney | 73/49.2 |
| 4,272,985 | 6/1981 | Repson, Jr. et al. | 73/49.2 |

Primary Examiner—Gerald Goldberg
Assistant Examiner—Tom Noland
Attorney, Agent, or Firm—James E. Nilles

[57] ABSTRACT

A method of inspecting storage tanks for leaks by means of pressure decrease and increase in the tanks, in which a part of a liquid 6 stored in a tank 1 is discharged to put the tank 1 under vacuum and variations in the pressure in the tank 1 with time are checked, the pressure in the tank 1 is thereafter increased to the level of the atmospheric pressure, and then the liquid which was discharged from the tank is poured back thereinto to put the tank under pressure and variations in the pressure in the tank with time are checked. The method is done by an apparatus designed for inspecting storage tanks for leaks by means of pressure decrease and increase in the tanks, having an air pipe (2), a measuring pipe (3), a liquid feed pipe (4), a liquid suction pipe (5) and an air-tight container (7), which are communicated with a tank (1) to be inspected, a pressure regulator pump (8) connected to the air-tight container (7), and a manometer (11) and a recording air gauge (10) connected to the measuring pipe (3).

2 Claims, 3 Drawing Figures

4,442,702

METHOD OF AND APPARATUS FOR INSEPCTING LIQUID STORAGE TANKS FOR LEAKS BY MEANS OF PRESSURE DECREASE AND INCREASE

DESCRIPTION

1. Technical Field

This invention relates to a method of and an apparatus for inspecting liquid storage tanks for leaks.

2. Background Art

In a method generally used of inspecting tanks for leaks, the tank is entirely emptied, the pressure in the tank is increased or decreased, and pressure variations with time are checked while the tank is under pressure or vacuum to determine whether the tank has a leak. However, it takes a lot of time and money to empty the tank, and this step can be very dangerous when the tank contains certain kinds of liquids. Moreover it takes much more time to make preparations for the inspection and for procedures afterwards than to actually inspect the tank. This causes a great loss of time.

DISCLOSURE OF INVENTION

The present invention provides a method and an apparatus which eliminates these drawbacks, and makes it possible to inspect a storage tank safely and reliably with the liquid left therein.

The inspection method according to the present invention is characterized in that it comprises the steps of air-tightly closing a tank with a liquid stored therein, discharging a part of the liquid from the tank to put the tank under vacuum and checking variations in the pressure therein with time; raising the pressure in the tank back to atmospheric pressure and then putting the tank under pressure by pouring the liquid discharged from the tank in the preceding discharging step back into the tank, and checking variations in the pressure in the tank with time.

The inspection apparatus according to the present invention characteristically comprises an air pipe, a measuring pipe and a liquid feed pipe, which are communicated with upper portions of a tank to be inspected, a liquid suction pipe communicated with a lower portion the tank to be inspected, an air-tight container communicated with a lower portion of the tank to be inspected via a valve, a pressure regulator pump communicated with the air-tight container, a manometer and a recording air gauge which are joined to the measuring pipe, and a valve connected to the measuring pipe and adapted to open the interior of the measuring pipe to atmospheric pressure.

BEST MODE FOR CARRYING OUT THE INVENTION

An embodiment of the present invention will now be described with reference to the drawings.

Figure 1:
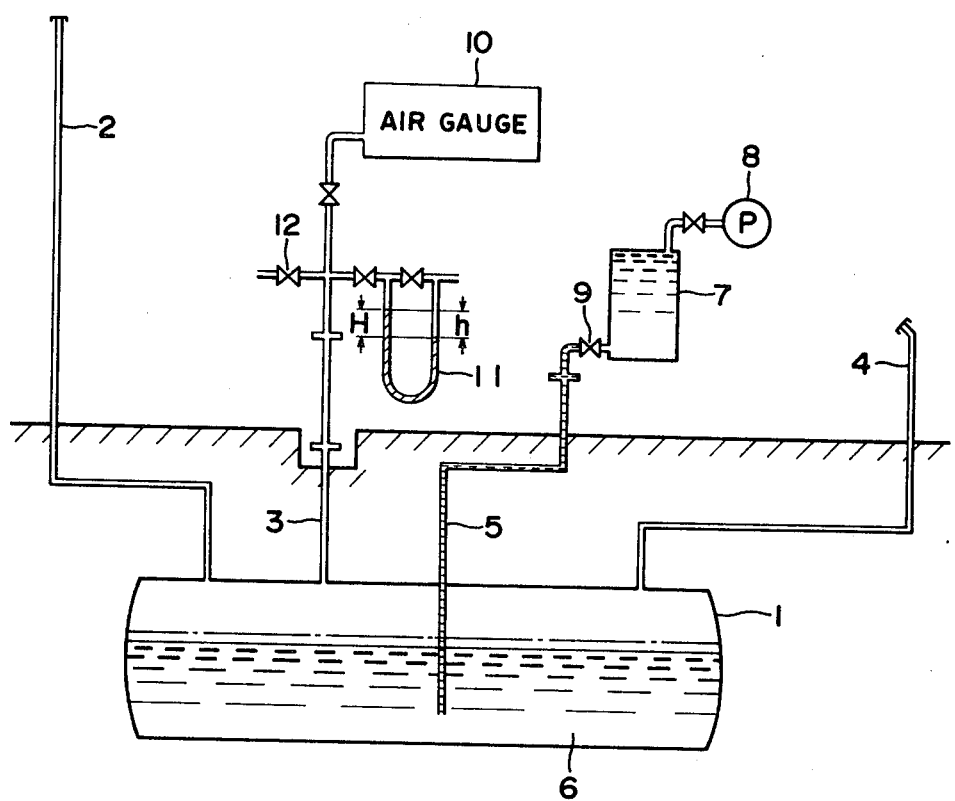
FIG. 1 illustrates an embodiment of a method of inspecting storage tanks for leaks by means of pressure decrease and increase according to the present invention.

Referring to FIG. 1, reference numeral 1 denotes a tank to be inspected, 2 an air pipe communicated with the tank 1 at an upper portion thereof, 3 a measuring pipe communicated with the tank 1 at an upper portion thereof, 4 a liquid feed pipe also communicated with the tank 1 at an upper portion thereof, 5 a suction pipe communicated with the tank at a lower portion thereof, and 6 a liquid stored in the tank 1.

According to the present invention, a small air-tight container 7 is provided with a pressure regulator pump 8 connected to an upper portion thereof, the suction pipe 5 which is communicated with the tank 1 being connected to a lower opening of the container 7 via a valve 9. One end of a manometer 11 and a recording air gauge 10 are joined to, for example, the measuring pipe 3 communicated with an upper portion of the tank 1. The other end of the manometer 11 is left open to atmospheric pressure. Blind covers are then put on the air pipe 2 and liquid feed pipe 4 to make the interior of the tank air-tight. The pressure regulator pump 8 is actuated to put the small air-tight container 7 under vacuum. The valve 9 is opened to apply the vacuum to the suction pipe 5 to suck up some of the liquid 6 stored in the tank into the small air-tight container 7 to store it therein. When a device for extracting the liquid in storage, such as a pump, is connected to the tank 1 the liquid may be sucked up in the depressurizing step. A chain line in the tank 1 represents the level of the liquid before any of it was sucked up.

The valve 9 is closed with the pressure in the space in the tank 1 thus reduced. At this time, the difference H between the pressure in the tank 1 and the atmospheric pressure, which difference H varies according to the pressure in the tank, is indicated by the manometer 11.

If the tank 1 has a leak, air enters the tank 1 from the outside since its interior is under vacuum. Consequently, the pressure in the tank 1 increases with time, and the water column difference H in the manometer is decreased.

The existence of a leak in the tank can be determined generally with reference to only the amount of the decrease in the water column difference H in the manometer 11. However, when certain kinds of liquid are stored in the tank, the pressure increases from the influence of the vapor pressure of the liquid even if no leaks exist in the tank, leading the inspector to believe that a leak exists in the tank. Variations in the pressure in the tank due to the vapor pressure of the liquid in storage will be described briefly with reference to the graph in FIG. 2.

Figure 2:
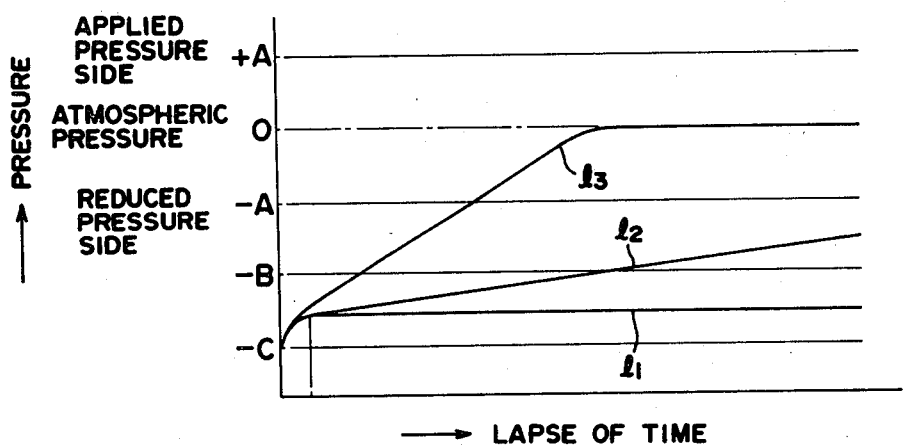
FIGS. 2 and 3 show examples of inspection curves obtained in the method.

Referring to FIG. 2, a curve $l_1$ denotes the relation between the pressure in the tank and the lapse of time when the liquid in storage has a comparatively low vapor pressure, such as water or kerosene. The curve $l_1$ shows that, when no leak exists, the pressure does not vary with time. When a leak exists, the pressure returns to atmospheric pressure in a short period of time as shown in a curve $l_3$, but does not exceed atmospheric pressure. When a liquid having a high vapor pressure such as a volatile oil is stored in the tank, the pressure increases with time, as shown by curve $l_2$, due to the pressure increase from the vapor pressure of the liquid even if no leak exists. This leads the inspector to believe that a leak exists in the tank. However, when a tank containing a liquid having a high vapor pressure is inspected, the influence of the vapor pressure can be eliminated by continuously carrying out a step which will be described later.

After the above-mentioned steps have been carried out, for example, the valve 12 connected to the measuring pipe 3 is opened to allow the pressure in the tank 1 to return to atmospheric pressure, and thereafter closed to make the tank 1 air-tight again. The pressure regulator pump 8 is then set and actuated to put the small air-tight container 7 under pressure. The valve 9 is opened to allow the liquid 6 stored in the container 7 to be poured back into the tank 1 via the suction pipe 5. Thus, the liquid sucked up in the preceding step is returned to the tank 1 to raise the level in the tank up to the chain line. In this stored liquid returning step, the liquid may be sent back to the tank 1 by gravity only, without increasing the pressure in the small air-tight container 7. The space in the tank 1 is thus put under pressure in accordance with the increase in the liquid level, and the manometer 11 indicates the difference h between the pressure in the tank 1 and the atmospheric pressure, in accordance with the condition of the pressure in the tank 1, Variations in the pressure in the tank 1 are recorded at predetermined time intervals as shown in FIG. 3, and whether or not a leak exists can be determined even when the vapor pressure of the liquid in the tank 1 is high, after the records of both vacuum and pressurized stages have been discussed collectively.

Figure 3:
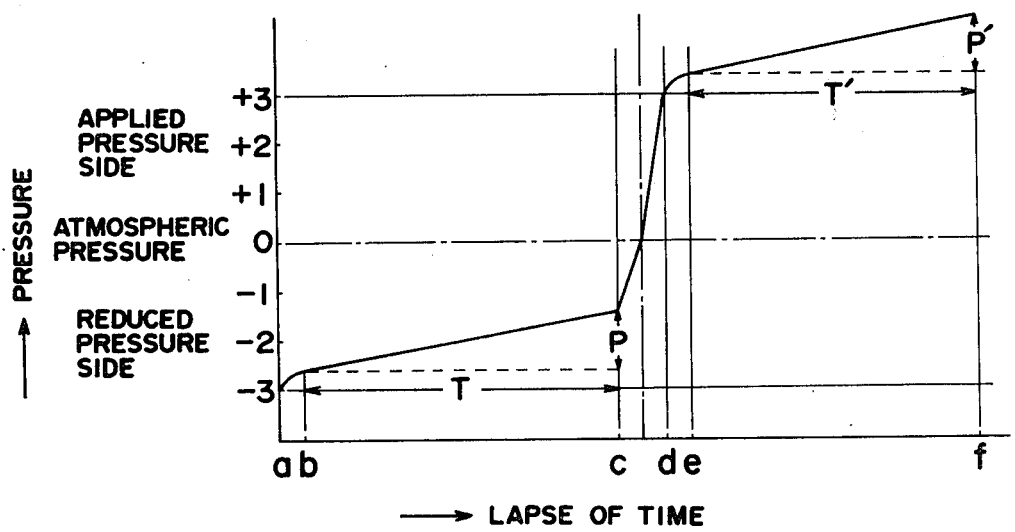

Referring to FIG. 3, the region between points a and c records the vacuum stage, and that between points d and e records the pressurized stage. The data between points a and b and between points d and e are those in initial unstable periods, and are not used to give a decision in the leakage inspection. Now, let T equal the time during which the pressure in the tank in the vacuum stage varies linearly, P the amount of variation in this pressure, T' the time during which the pressure in the tank in the pressurized stage varies linearly, and P' the amount of variation in the pressure in the latter stage. When no leaks exist in the tank with a liquid of a low vapor pressure stored therein, the values of both P and P' are close to zero. When the vapor pressure of the liquid is high and the tank has no leaks, then $P/T \approx P'/T'$, and when the tank has a leak, P (in the vacuum stage)=pressure increase due to the leak+vapor pressure, so that P' (in the pressurized stage)=vapor pressure−pressure loss due to the leak; and accordingly, $P/T > P'/T'$.

As a result, whether or not a leak exists can be determined very easily.

A liquid has a more or less unique vapor pressure, so the method and apparatus according to the present invention can be used effectively to inspect a storage tank with the stored liquid left therein.

Industrial Applicability

As described above, the method of and apparatus for inspecting storage tanks for leaks by means of pressure decrease and increase in the tank are greatly advantageous in that they permit inspection of a tank for leaks extremely safely and reliably irrespective of the kind of the liquid stored therein.

I claim:

1. A method of testing for leakage of a tank that contains a liquid having a high vapor pressure, said method being characterized by:

A. sealing the tank from the atmosphere;
B. with the tank thus sealed, withdrawing from the tank to a container a part of the liquid stored in the tank, to reduce pressure in the portion of the tank that is above the liquid therein to a subatmospheric value;
C. making a first measurement of the rate of increase per unit of time of pressure in said portion of the tank, during at least a final portion of a period long enough to ensure that said rate has attained a stable value;
D. while said part of the liquid remains in said container, venting the tank to atmosphere to equalize pressure in said portion of the tank with atmospheric pressure;
E. thereafter resealing the tank from the atmosphere;
F. with the tank resealed, returning to the tank from said container the part of the liquid that had been withdrawn from the tank, to increase the pressure in said portion of the tank to an above-atmospheric value; and
G. making a second measurement of the rate of increase per unit of time of pressure in said portion of the tank, through at least a final portion of a period long enough to ensure that said rate has attained a stable value, for comparison with the rate found by said first measurement, the existence of a leak in the tank being signified by a difference between the compared rates.

2. Apparatus for testing for leakage of a tank that contains a liquid having a high vapor pressure, said apparatus comprising:

A. means for readily openably sealing the interior of the tank from the atmosphere so that the space in the tank that is above the level of said liquid therein can be selectably evacuated, vented and pressurized;
B. a container for holding a quantity of said liquid that is substantially less than the amount of said liquid normally in the tank;
C. duct means in sealed relation to said tank and said container, for communicating the interior of the container with the interior of the tank near the bottom thereof;
D. a valve in said duct means that can be alternatively opened for communication of the tank and the container and closed for blocking such communication;
E. means defining a vacuum source communicable with the interior of said container to enable a portion of the liquid in the tank to be drawn into the container when the tank is sealed, to produce a subatmospheric pressure in said space; and
F. a recording pressure gage communicating with said space in the tank, to provide for a first measurement of the rate of increase of pressure in said space after said subatmospheric pressure has been produced and for a second measurement of said rate after the tank has been vented to atmosphere and resealed and liquid has then been returned from the container to said tank to pressurize said tank, so that leakage can be ascertained from a difference between the rates found in the first and second measurements.

* * * * *